US005604676A

United States Patent [19]
Penzias

[11] Patent Number: 5,604,676
[45] Date of Patent: Feb. 18, 1997

[54] SYSTEM AND METHOD FOR COORDINATING PERSONAL TRANSPORTATION

[75] Inventor: Arno A. Penzias, Highland Park, N.J.

[73] Assignee: Lucent Technologies Inc., Murray Hill, N.J.

[21] Appl. No.: 280,040

[22] Filed: Jul. 25, 1994

[51] Int. Cl.$^6$ ..................................................... G06F 17/60
[52] U.S. Cl. ................... 364/464.27; 364/400; 364/407; 364/436
[58] Field of Search ................................... 364/400, 401, 364/407, 436, 467

[56] References Cited

U.S. PATENT DOCUMENTS

| | | | |
|---|---|---|---|
| 3,268,727 | 8/1966 | Shepard | 364/436 X |
| 3,572,718 | 3/1971 | Moore | 273/254 |
| 4,061,336 | 12/1977 | Lincoln | 273/254 |
| 4,360,875 | 11/1982 | Behnke | 364/436 |
| 5,006,985 | 4/1991 | Ehret et al. | 364/401 X |
| 5,122,959 | 6/1992 | Nathanson et al. | 364/436 |
| 5,177,685 | 1/1993 | Davis et al. | 364/443 |
| 5,272,638 | 12/1993 | Martin et al. | 364/444 |
| 5,371,678 | 12/1994 | Nomura | 364/436 X |

OTHER PUBLICATIONS

Gary Stix, "Putting the Mass Back in Transit", *Scientific American*, May 1995.

Primary Examiner—Edward R. Cosimano

[57] ABSTRACT

Door-to-door transportation is provided in a nearly on-demand manner by employing a set of multipassenger vehicles, e.g., vans, whose routes are continuously updated. The position of each multipassenger vehicle, as well as the traffic conditions along the projected route of each multipassenger vehicle, are constantly monitored. Upon receiving a request for a ride, e.g., via telephone, which specifies a) the pick-up location, b) the destination and, optionally, c) a desired time of arrival thereat and d) the number of people, a suitable "path" to the destination which satisfies the request is determined, if possible. A "path" for a ride is a specification of the particular multipassenger vehicles, and the location and nature of any required transfers for a person's requested ride. A path may also include the streets over which the rider will pass and any scheduled stops. The path is developed as a function of (i) the pick-up location of all riders requesting rides, (ii) the destinations of the riders, (iii) the present position of each multipassenger vehicle, (iv) the presently scheduled routes of each multipassenger vehicle, and (v) the traffic conditions. Optionally, a rider's developed path may also be a function of his desired arrival time. The routes for each multipassenger vehicle affected by the developed path are accordingly updated.

39 Claims, 4 Drawing Sheets

SYSTEM AND METHOD FOR COORDINATING PERSONAL TRANSPORTATION

TECHNICAL FIELD

This invention relates to transportation systems generally, and, more specifically, to a door-to-door transportation system for coordinating the provision of rides to people in lieu of their using their own personal cars or other individual means of transportation.

BACKGROUND OF THE INVENTION

Many people enjoy the door-to-door convenience and freedom from being locked into a fixed schedule afforded to them by driving their own personal cars wherever they wish to go. However, because most automobiles on the road are carrying only a single occupant, such automobile use has lead to 1) over crowded roads, 2) a lack of parking, 3) a dependence on foreign oil, and 4) poor air-quality. One prior art solution, car pooling, is inadequate because of a) the difficulty of matching individuals to ride together, b) the erratic nature of non-commuter travel, which accounts for a large percentage of all automobile trips, c) rigid scheduling requirements, and d) a lack of backup transportation should a rider's schedule change. Another prior art solution, mass transit, does not provide the door-to-door convenience desired by those used to driving their own cars wherever they go.

U.S. Pat. No. 4,360,875, issued to Behnke, discloses a system for facilitating car pooling. However, such a system relies on the haphazard offering of rides by drivers. It is thus incapable of providing commuters with the efficient transportation and comforts they require.

SUMMARY OF THE INVENTION

I have recognized that door-to-door transportation can be provided in a nearly on-demand manner by employing a set of multipassenger vehicles, e.g., vans, whose routes are continuously updated. As used herein, a "route" is the planned course for a van to take. The position of each multipassenger vehicle, as well as the traffic conditions along the projected route of each multipassenger vehicle, are constantly monitored. Upon receiving a request for a ride, e.g., via telephone, which specifies a) the pick-up location, b) the destination and, optionally, c) a desired time of arrival thereat and d) the number of people, a suitable "path" to the destination which satisfies the request is determined, if possible. As used herein, a "path" for a ride is a specification of the particular multipassenger vehicles, and the location and nature of any required transfers for a person's requested ride. A path may also include the streets over which the rider will pass and any scheduled stops. The path is developed as a function of (i) the pick-up location of all riders requesting rides, (ii) the destinations of the riders, (iii) the present position of each multipassenger vehicle, (iv) the presently scheduled routes of each multipassenger vehicle, and (v) the traffic conditions. Optionally, a rider's developed path may also be a function of his desired arrival time. The routes for each multipassenger vehicle affected by the developed path are accordingly updated.

Exact directions are delivered frequently to each multipassenger vehicle's driver, so that he can easily follow the present route for his multipassenger vehicle. Also transmitted to the multipassenger vehicles are the identities, e.g., names, of the passengers who are boarding and the identities of passengers who are to alight at any particular destination. A ticket or electronic equivalent thereof, e.g., a charge to a "smartcard", may be supplied to the riders. A "smartcard", as used herein is a credit card size device containing a microcomputer.

As requests for rides are received or traffic conditions change, the routes of the multipassenger vehicles and the paths of the riders are updated to meet, as closely as possible, the arrival times of all riders and requesters. In one embodiment of the invention, in the event of changing conditions along the present routes, cancellations, or new requests for rides, preference is given to meeting the arrival times of those individuals who are already passengers in the multipassenger vehicles. In another embodiment of the invention, a priority system is provided in which an actual or prospective passenger may agree, after the time that a delay is first anticipated, to pay a higher rate to receive preference in the event conditions may cause his arrival time to be delayed.

DETAILED DESCRIPTION

Figure 1:
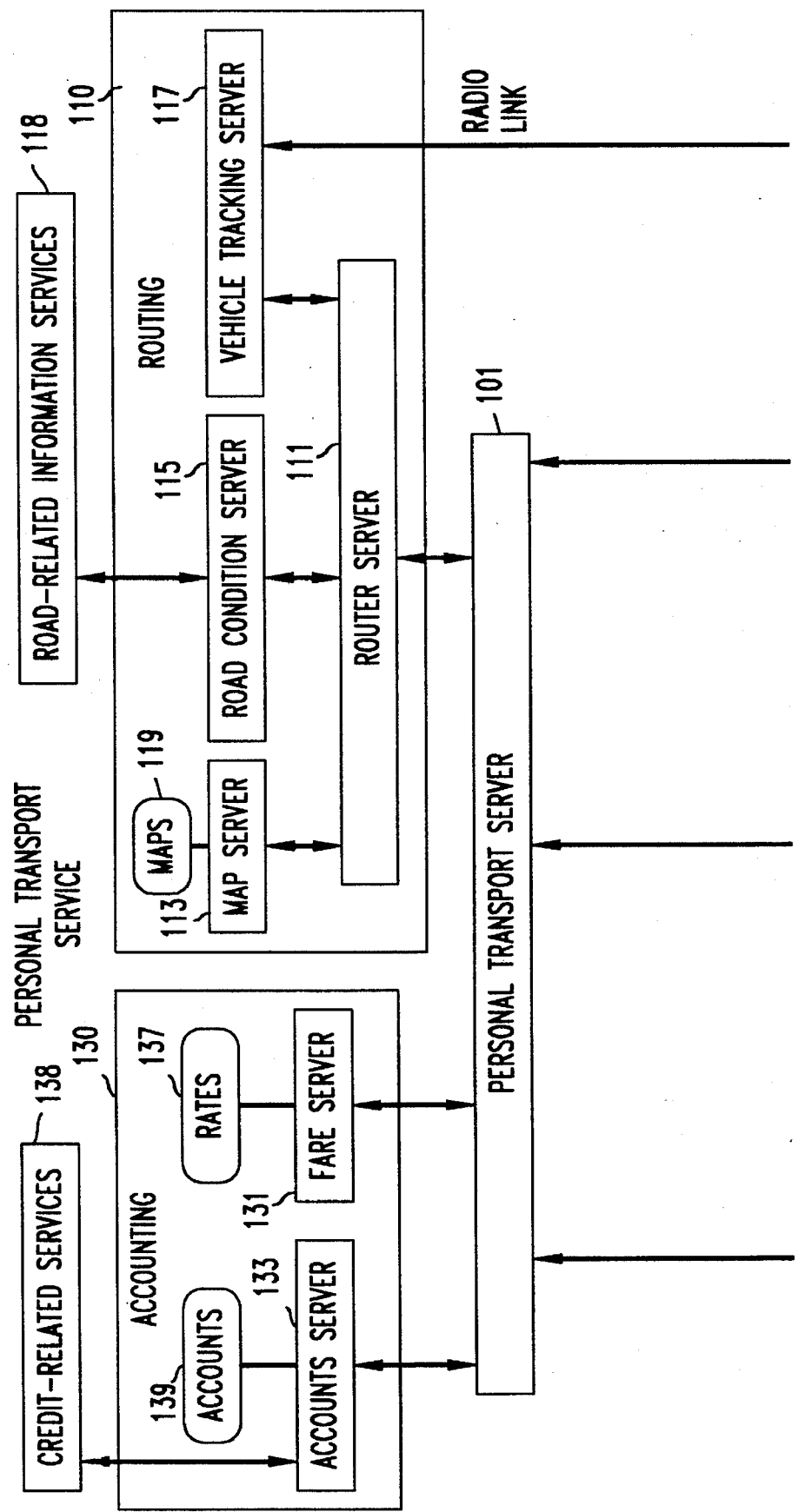
FIGS. 1 and 2, when connected together as shown in FIG. 3, show an exemplary architecture for use in a system providing door-to-door personal transportation in a nearly on-demand manner by employing a set of multipassenger vehicles whose routes are continuously updated, in accordance with the principles of the invention.
Figure 2:
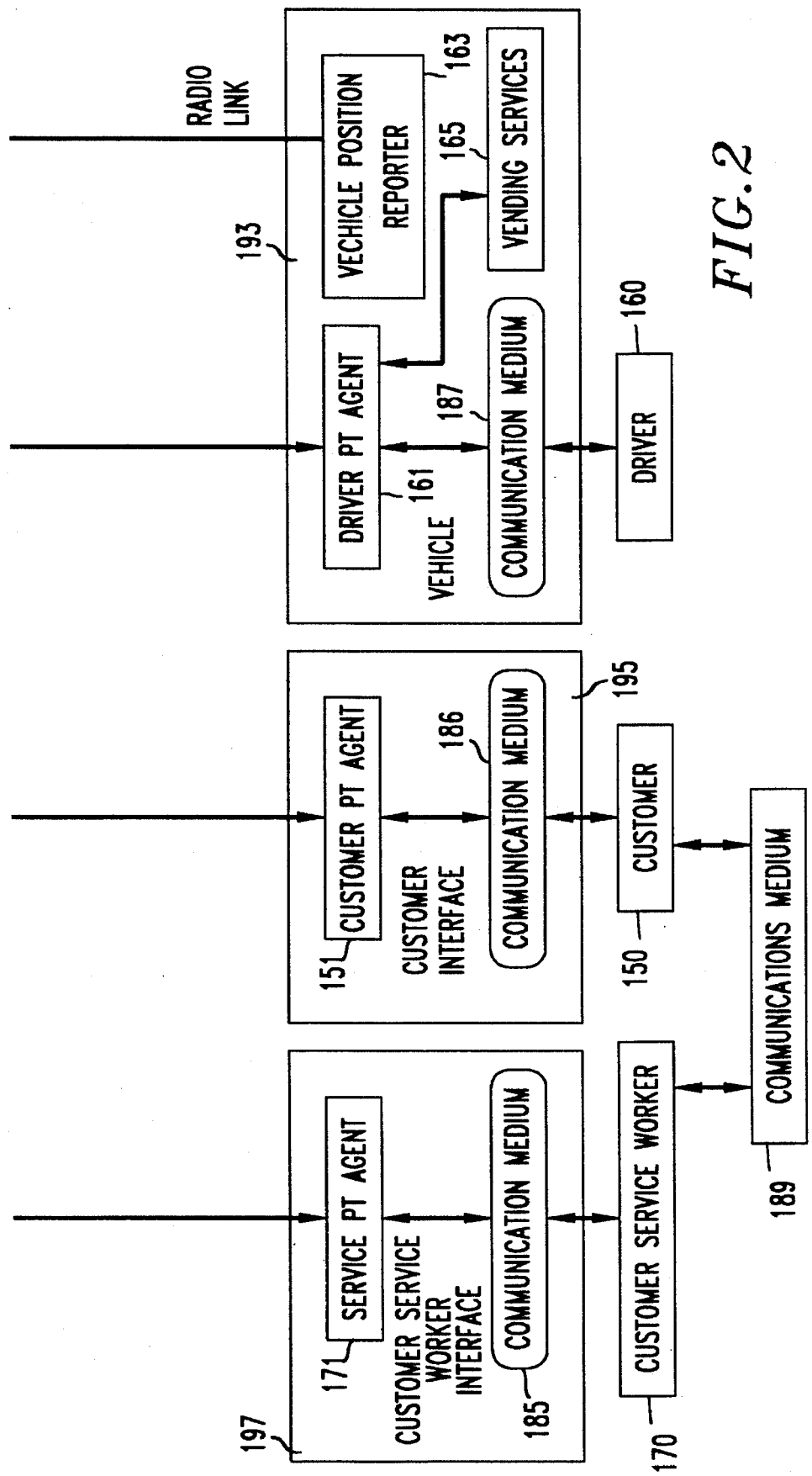
Figure 3:
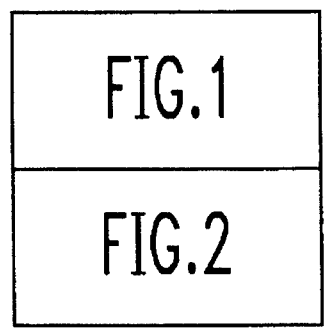

FIGS. 1 and 2, when connected together as shown in FIG. 3, show an exemplary architecture for use in a system providing door-to-door personal transportation in a nearly on-demand manner by employing a set of multipassenger vehicles, e.g., vans, whose routes are continuously updated, in accordance with the principles of the invention. Shown are personal transport server 101, routing unit 110, accounting unit 130, vehicle 193, customer interface 195 and customer service worker interface 197.

Routing unit 110 contains all the necessary processing power, e.g., a processor operable under control of stored programs, and information in order to develop paths for the ride of each passenger and routes for each of the multipassenger vehicles. Router server 111 maintains a complete representation of a) the area served by the personal transportation service; b) the location, status, and currently scheduled route of each multipassenger vehicle; c) the active customers and their ride parameters, which include (i) pick-up location, (ii) destination, (iii) desired arrival time, (iv) pick-up time, (v) maximum number of transfers, (vi) priority of arriving at the specified arrival time, (vii) number in party, (viii) quantity of luggage, and (ix) a presently scheduled path. This complete representation is termed the "personal transport world model".

Map server 113 provides router server 111 with a layout of the roads in the area. Map server 113 does so by accessing information stored in maps database 119, which may be commercially provided, and communicating the accessed information to router server 111 in a form suitable for processing by it. Router server 111 receives from road condition server 115 a description of current and scheduled road conditions. Some or all of this information may be provided by services external to routing unit 110, e.g., road related information services 118. Exemplary road conditions that may be included are: 1) road work schedules, 2) parades, 3) weather related conditions, 4) accident information, 5) historical time related data, e.g., rush hours, holiday traffic loads, etc.

Router server 111 also receives from vehicle tracking server 117 the position, and optionally the direction, of each of the multipassenger vehicles. Vehicle tracking server 117 receives the position of each of the multipassenger vehicles via radio link, e.g., cellular tracking or the well known global positioning system (GPS). From the progress of each multipassenger vehicle along its assigned path router server 111 can determine traffic flow conditions based on the expected rate of progress for that vehicle, which was used to determine the paths of the vehicles. Thus, unreported traffic conditions may be detected and may be used to update road condition information stored in road condition server 115. Personal transport server 101 also transmits to router server 111 the identity and status of each passenger in, or scheduled to be in, each multipassenger vehicle, and road condition information reported by the drivers of the multipassenger vehicles.

Routes for the multipassenger vehicles and rides for the customers are developed by routing unit 110 in response to requests from personal transport server 101. This is done using the same well known techniques and principles for routing any type of traffic over a network, e.g., airplanes between hubs, trucks over roads between defined locations, etc. The developed routes and paths are then supplied to personal transport server 101. Of course, in developing the routes and paths, the capacities and occupancies, or projected occupancies, of the multipassenger vehicles are taken into account so that a customer is not assigned a seat in a vehicle that is already, or is projected to be, full.

Router server 111 continually checks the presently scheduled path of each passenger for conflicts, i.e., a path that can no longer be followed due to heretofore unforeseen conditions such as the arising of a traffic jam. In response to the detection of a conflict, router server 111 reroutes and reschedules all effected passenger paths and multipassenger vehicle routes. It also notifies personal transport server 101 of the resulting changes.

Personal transport server 101 controls overall operation of the personal transport service. Its main functions are to dispatch multipassenger vehicles in response to customer requests for rides and to coordinate overall communication of information among the other units of the personal transport service. Personal transport server 101 receives requests from customers via customer personal transport (PT) agent 151.

Customer PT agent 151 is a logical process that interfaces with a customer, e.g., customer 150, to receive the customer's ride request and relay that ride request in a form compatible with personal transport server 101. The request of customer 150 is communicated to customer PT agent 151 using any conventionally available communication medium 186, e.g., telephone lines, or data networks.

A customer may also communicate with customer service worker 170, e.g., over communication medium 189. Customer service worker 170, in turn, relays the customer's request to personal transport server 101, via communication medium 185 and service PT agent 171.

In response to a request for a ride, either from a customer directly or via a customer service worker, personal transport server 101 queries routing unit 110 for the viable paths that satisfy the customer's requested ride. As stated previously, a "path" for a ride is a specification of the particular multipassenger vehicles, and the location and nature of any required transfers. A path may also include the streets over which the rider will pass and any scheduled stops. In developing the paths, priority in the scheduling of rides, e.g., in the meeting of specified arrival or departure times or having the shortest traveling time, may be given to those riders whose rides are already in progress, were previously scheduled, or have agreed to pay a premium rate.

Upon receipt of paths from routing unit 110, personal transport server 101 submits the paths to accounting unit 130. Accounting unit 130 returns to personal transport server 101 a price for each path. Personal transport server 101 relays the paths and their corresponding prices back to the customer over the same connection over which it had received the request from the customer.

The customer then chooses a desired path which is relayed to personal transport server 101. Personal transport server 101 adds the selected path to its representation of the scheduled paths. It also adjusts 1) the paths of any customers whose rides may have been affected by adding the new path and 2) the routes of any affected multipassenger vehicles.

In response to the just added path, router server 111 transmits to the personal transport server 101 multipassenger vehicle route update information. Personal transport server 101 in turn transmits the multipassenger vehicle route update information to driver personal transport (PT) agent 161 for use by drivers 160 in guiding their multipassenger vehicles along their new route.

Drivers 160 report passenger status and observed road conditions back to personal transport server 101, via driver PT agent 161 and communication medium 187. When a person has completed his ride, e.g., as indicated by a change in status to disembarked at his destination, personal transport server 101 notifies accounting unit 130, so that the customer may be properly billed.

Each multipassenger vehicle 193 is equipped with vehicle position reporter 163. Vehicle position reporter 163 is used to transmit the present location, and optionally the direction, of the multipassenger vehicle, as noted above. Each multipassenger vehicle 193 may also contain on board services unit 165, e.g., a vending machine, a set of video displays, a set of data terminals, or a set of mobile communication terminals, which provides products and/or services to passengers and records each transaction.

Each multipassenger vehicle 193 may further contain communications facilities for connecting on board passengers to a customer interface 195. A mobile communication terminal which is part of on board services unit 165 may also be used for this purpose. Such facilities notify the multipassenger vehicles that the arrival time of one or more passengers riding therein will be delayed, and allow one or more passengers to request changes to their paths or to request priority service so that they reach their destinations as close to the desired arrival time as possible when paths are reconfigured in the event that unanticipated delays are encountered. Such requests are processed as are the other ride requests described above. A premium rate may be charged for granting such priority or a mid-ride change.

Accounting unit 130 includes fare server 131 connected to rates data base 137. Fare server 131 computes the fares for each path supplied by personal transport server 101. Typically the fares are a function of distance to be traveled during the ride, number of transfers, time of day, day of week, criticality of arrival time, e.g., as determined by priority.

Rates data base 137 contains tables that relate the various factors that determine a fare and actual money amounts.

Accounting unit 130 also includes account server 133 connected to accounts data base 139. Account server 133 is responsible for the ultimate billing of a passenger who has completed a ride as well as any other incurred fees such as purchases made from on board services unit 165. Accounts server 133 may generate a direct bill which is sent to the passenger. Also, account server 133 may be connected to external, commercially available credit services 138, e.g., commercial credit card data bases or telephone customer databases. Doing so facilitates billing the cost of a ride to a commercial credit card as well as a way to check the credit-worthiness of a rider. Accounts data base 139 keeps a billing history for each of the passengers.

The links of the architecture shown in FIGS. 1 and 2 are logical links. The underlying physical connections which implement the logical links can be carried over any conventional network, or combination of networks. These networks may be implemented using any communications media, e.g., copper wires, optical fiber or radio or combination thereof.

TABLE 1

```
FLOW OF CONTROL FOR THE PERSONAL TRANSPORT SERVER (101)
while(1)
    Receive message M from source S
    T = message type;
if (S == Communication PT Agent (151) or
    S == Service PT Agent (171)) then
{
        if (T == CUSTOMER_REQUEST FOR ROUTE) then
                (pick-up location, destination, desired time of arrival,
                desired time of departure,
                bound on number of transfers, number in party, luggage, etc.)
                send REQUEST to Router Server(111)
                P = paths from Router Server(111)
                send REQUEST_FARES with P to Fare Server(131)
                F = fares(P)
                send P and F to S (source)
                receive selection -- RI -- route_id from S
                send CONFIRMATION to Router Server(111) for RI
                send CONFIRMATION and instructions to S for RI
        else if (T == CUSTOMER_CANCELLATION_ROUTE) then
                (RI = route_id)
                send NOTIFICATION ROUTE CANCELLATION to Router Server(111) of RI
                send NOTTFICATION ROUTE CANCELLATION to S of
else if (S == Driver PT Agent(161))
{
        if (T== UPDATE PASSENGER INFORMATION (for customer C)) then
                /*(passenger embarkation or disembarkation)*/
                send UPDATE PASSENGER INFORMATION to Router Server(111)
                if (trip completed) then
                send UPDATE PASSENGER INFORMATION to Fare Server(131)
        else if (T== UPDATE_ROAD_CONDITIONS) then
                send ROAD_CONDITIONS to Router Server(111)
        else if (T==UPDATE_FEES) then
                send UPDATE_FEES to Accounts Server(133)
        }
}
else if (S == Router Server(111))
{
        if (T==CHANGE_IN_ROUTE) then
                for all drivers, D, affected by route:
                        send INSTRUCTIONS to Customer PR Agent(151) for C
                for all customers, C, affected by route:
                        send INSTRUCTIONS to Customer PR Agent(151) for C
        }
}
```

Table 1 shows pseudo code for an exemplary negotiation process performed by personal transport server 101 to develop and store a reservation for a ride for a customer. The process shown in Table 1 is an event based process that is activated upon receiving messages from any of the other units to which it is connected. If a message is received from a customer PT agent 151 or service PT agent 171, personal transport server tests to determine if the message is a customer's request for a ride. Such a request includes 1) a pick up location, 2) destination, 3) desired time of arrival at the destination, 4) desired time of departure, and 5) any limitation on the number of transfers. In response to the message, if the message is a ride request, personal transport server 101 sends a request for paths to router server 111. A set of paths, P, is received from router server 111.

Personal transport server 101 forwards the paths to fare server 131 and requests that each path of set P be assigned a fare. Set of fares, F, is received from fare server 131 with one member of set F corresponding to each member of set P. The paths and fares are forwarded by personal transport server 101 to the agent from which the request for a ride originated. The customer selects one of paths and transmits an indication of his selection to personal transport server 101.

Confirmation of the selected path may be supplied to the customer. This confirmation may include additional details such as the location of the transfer points. Personal transport server 101 also communicates to router server 111 the path selected by the customer.

If the message received from the customer is a cancellation message, personal transport server 101 sends a message to router server 111 indicating the particular customer ride that has been canceled. This will allow router server 111 to reconfigure and potentially speed up other already scheduled rides.

It is noted that the customer may request that an existing ride be modified by specifying a change in one or more of the ride request parameters, e.g., pick-up or arrival time, priority, destination, pick-up location. As will be readily apparent to those skilled in the art, such modifications may be provided for in a manner similar to canceling an existing ride request and then requesting a new ride.

If personal transport server 101 receives a message from driver PT agent 161 it tests to determine if the message was a) an update passenger status, b) an update road conditions message, or c) update additional fees. If the message is an update passenger status message, the message specifying a particular passenger and how his status is to be updated, personal transport server 101 sends an update passenger information message to router server 111, which then updates its personal transport world view model. Additionally, if the update passenger message indicates that a passenger's ride has been completed, the personal transport server 101 transmits a message to accounting unit 130 for proper billing of the customer. If the message received by personal transport server 101 is an update road conditions message, which indicates a road condition observed by the driver, it is forwarded to router server 111 which updates its personal transport world view model. If the message received was one indicating additional fees to be charged to a particular rider, personal transport server 101 forwards an appropriate message to account server 133.

If personal transport server 101 receives a message from router server 111, such a message signals a change in the route of at least one of the multipassenger vehicles. In response to such a message personal transport server 101 transmits to driver PT agent 161 of the affected drivers any necessary change in the directions for their respective multipassenger vehicles. Similarly, personal transport server 101 transmits messages to customer PT agent 151 of each customer who is affected by the route changes to inform them of their new paths.

TABLE 2

```
FLOW OF CONTROL FOR ROUTING (110)
global variable: change_in_world_view = FALSE
/* is set when world view is altered */
while(1)
    if (change_in_world_view == TRUE) then
        if (conflict detected) then
                handle conflict
                if (changes in routes R)then
                        send CHANGE_IN_ROUTE(R) to Personal Transport(101)
if (new message)
    {
        Receive message M from source S
        T = message type;
        if (S == Personal Transport System(101)) then
        {
                if (T==REQUEST FOR ROUTE) then
                (pick-up location, destination, desired time of arrival,
                desired time of departure, bound on number of transfers,
                number in party, luggage, etc.)
                create P and send to Personal Transport Server (101)
        else if (T==NOTIFICATION ROUTE CONFIRMATION) then
                update area representation to include new route
        else if (T==NOTIFICATION ROUTE CANCELLATION) then
                update area representation to include new route
        else if (T==UPDATE PASSENGER INFORMATION) then
                /* passenger embarkation or disembarkation) */
                update area representation with new information
        }
        else if (S== Vehicle Tracking Server(117)) then
                if (T==UPDATE VEHICLE LOCATION/DIRECTION) then
                        update area representation with new information
        else if (S== Road Condition Server(115)) then
                case UPDATE ACCIDENT_INFO:
                case UPDATE ROAD_WORK_INFO:
                case UPDATE PARADE_INFO:
                case UPDATE HOLIDAY_INFO:
                case UPDATE WEATHER_CONDITION_INFO:
                case UPDATE TRAFFIC_INFO:
                /* and other road related cases */
                update area representation with new information
}
```

Table 2 shows pseudo code for an exemplary process performed by router server 111 to a) maintain its personal transport world model and b) store a request for a ride for a customer. The process shown in Table 2 is an event based process that is activated upon receiving messages from 1) personal transport system 101, 2) vehicle tracking server 117, or 3) road condition server 115, to which router server 111 is connected. After processing a received message, router server 111 checks to determine if any conflicts have arisen.

If a message received from personal transport server 101 is a request for a path that includes specified ride parameters, router server 111 searches for paths that meet the specified ride parameters. These paths are grouped together and supplied to personal transport server 101 as set P. Router server 111 may receive from personal transport server 101 either a) a path confirmation notification or b) a path cancellation notification. In either case, router server 111 updates its personal transport world model in accordance with the particular path that was confirmed or canceled. Similarly, router server 111 may receive from personal transport server 101 an update passenger information message. In response to such a message, router server 111 again updates its personal transport world model to reflect the updated information it received.

Likewise, messages received from vehicle tracking server 117 or road condition server 115 are also used to appropriately update personal transport world model.

Every time router server 111 updates its personal transport world model, it checks to determine whether a conflict has occurred. The occurrence of a conflict may result in new routes for one or more of the multipassenger vehicles. In the event of a routing change, a message is sent to personal transport server 101 which forwards new instructions to the appropriate drivers. Furthermore, in the event of a conflict, router server 111 must search to determine new paths for those riders whose paths have been affected by the occurrence of a conflict.

Figure 4:
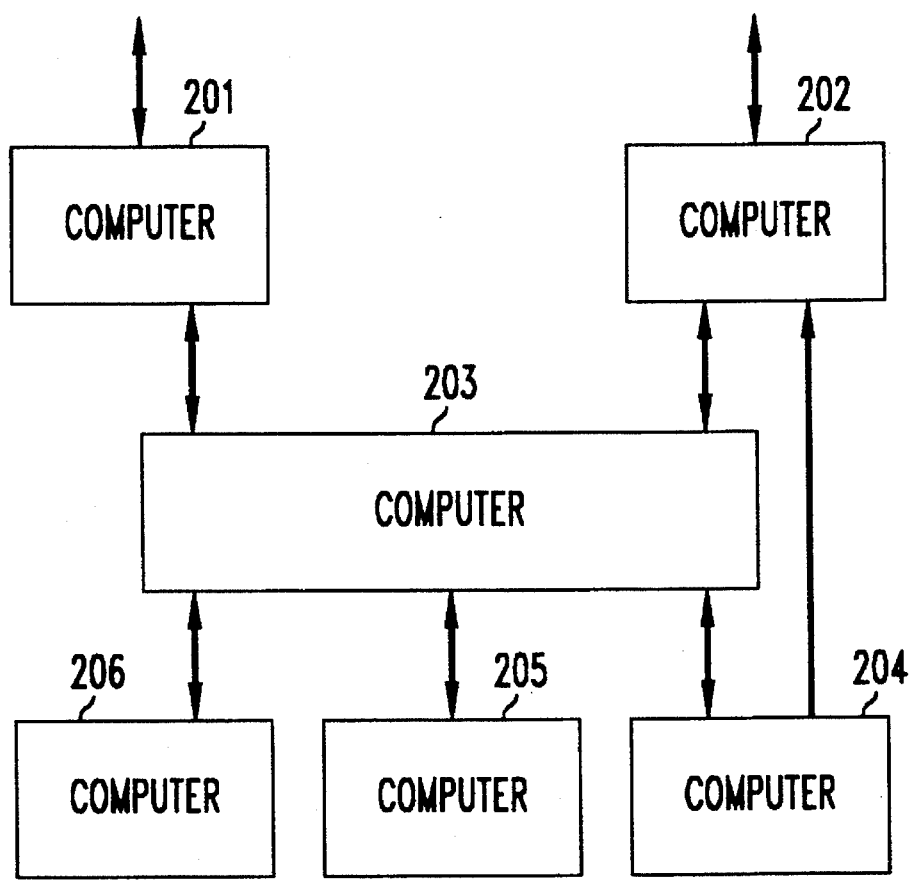
FIG. 4 shows an exemplary distributed computer system implementing the architecture of FIGS. 1 and 2.

FIG. 4 shows an exemplary distributed computer system implementing the architecture of FIGS. 1 and 2 for carrying out the invention. Computer 201 implements the functions of accounting unit 130, computer 202 implements the functions of routing unit 110, computer 203 implements the functions of personal transport server 101, computer 204 implements the functions performed in vehicle 193, computer 205 implements the functions of customer PT Agent 151 and computer 206 implements the functions of service PT Agent 171. Each of computers 201, 202, 203, 204, 205, and 206 may have the exemplary structure shown in FIG. 5.

Figure 5:
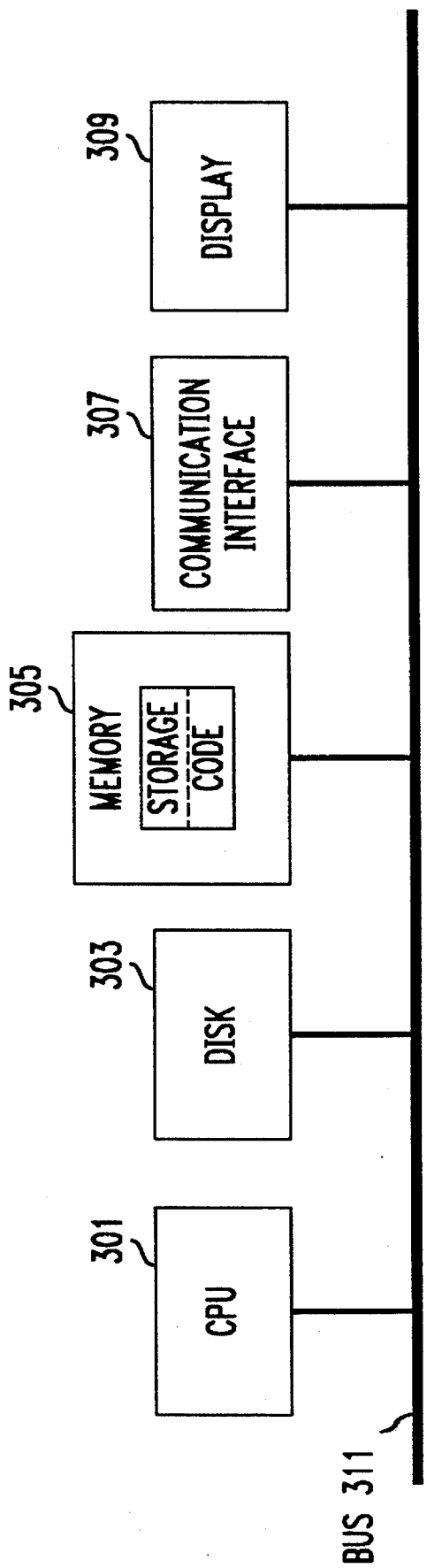
FIG. 5 shows an exemplary computer structure for individual computers shown in FIG. 4.

Each computer shown in FIG. 5 includes central processing unit (CPU) 301, disk 303, memory 305, having both storage and code areas, communication interface 307, display 309 and bus 311. Each of computers 201, 202, 203, 204, 205, and 206 are able to perform different functions by virtue of their each having a) different code sections in memory 305 and b) different communications interfaces provided by communication interface 307. For example, the pseudocode of Table 1 is stored in the code section of memory 305 of computer 203 while the pseudocode of Table 2 is stored in the code section of memory 305 of computer 202. Similarly, for example, communication interface 307 of computer 204 will support connections to both computers 202 and 203 while communication interface 307 of computer 203 will support connections to computers 201, 202, 204, 205 and 206. It is noted that communication medium 185, 186, 187, 189 may all be interconnected or each may be a part of a larger network.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A system for coordinating substantially on-demand transportation, comprising:

means for receiving at least one request for a ride, said request specifying a pick-up location and a destination location;

means for storing a route for each of a plurality of vehicles;

means for monitoring at least a present position of each of said vehicles and the traffic conditions existing along their respective routes; and means for developing and updating a path for said ride as a function of current factors including (i) said pick-up location, (ii) said destination location, (iii) said present position of said vehicles, (iv) said route for each of said vehicles, and (v) said traffic conditions, and on changes in the current factors; said path for said ride specifying an ordered arrangement of at least one of said vehicles and the locations of any required transfers.

2. The invention as defined in claim 1 wherein said request includes a desired time to arrive at said destination location and said means for developing is responsive to said desired arrival time to develop said path also as a function of said desired arrival time.

3. The invention as defined in claim 1 wherein said request includes a desired departure time from said pick-up location and said means for developing is responsive to said desired departure time to develop said path also as a function of said desired departure time.

4. The invention as defined in claim 1 wherein said path restricts the transfer from one of said vehicles to another to only predefined transfer points and wherein said means for developing is arranged to develop said path also as a function of the location of said predefined transfer points.

5. The invention as defined in claim 1 wherein said vehicles are each, independently, substantially limited to either (i) one of a plurality of particular predefined local geographic areas or (ii) a predetermined route between said local geographic areas.

6. The invention as defined in claim 1 further including:
   means for communicating to said person an estimated pick up time.

7. The invention as defined in claim 1 further including:
   means for communicating said path.

8. The invention as defined in claim 1 wherein said means for monitoring receives said traffic conditions as a digitally encoded traffic information signal supplied by a traffic information service.

9. The invention as defined in claim 1 wherein said means for monitoring further determines traffic flow conditions from received periodic present position reports from said vehicles by comparing said received position reports against anticipated positions of said vehicles developed as a function of reported traffic conditions and said routes of said vehicles.

10. The invention as defined in claim 1 wherein said request for a ride is transmitted to said means for receiving via a telephone network.

11. The invention as defined in claim 1 wherein said means for monitoring comprises a satellite-based vehicle tracking system.

12. The invention as defined in claim 1 wherein said vehicle is a multipassenger vehicle.

13. The invention as defined in claim 1, further comprising means for providing a ride.

14. The invention as defined in claim 1, further comprising means for communicating said path to the at least one of said vehicles.

15. The invention as defined in claim 1 further including in at least one of said vehicles, means for communicating a change of said destination location while en route and wherein:

said means for developing is responsive to said communication for developing an updated present path; and said updated present path is communicated to said at least one of said vehicles.

16. The invention as defined in claim 15 further including means for charging a premium for developing said updated present path.

17. The invention as defined in claim 1 further including:

means for modifying said route of at least one of said vehicles to incorporate changes necessary to accommodate said ride according to said developed path.

18. The invention as defined in claim 17 further including:

means for relaying modified routes to said vehicles.

19. The invention as defined in claim 1 further including:

means for communicating to at least one of said vehicles that a delay in the arrival time of at least one of said rides is presently likely;

means for receiving a response from said at least one vehicle that said at least one ride agrees to pay a premium rate to have a new path developed so that said likely delay is avoided; and means for modifying said route of said at least one vehicle to incorporate changes necessary to accommodate said ride according to said developed path.

20. The invention as defined in claim 19 further including means for billing said at least one ride said premium rate.

21. The invention as defined in claim 1 further including means for billing said ride.

22. The invention as defined in claim 21 wherein said ride is billed to a credit account.

23. The invention as defined in claim 22 wherein said credit account is a credit card account.

24. The invention as defined in claim 22 wherein said credit account is an account associated with a telephone line.

25. A method for dispatching vehicles and coordinating on-demand, door-to-door rides, the method comprising the steps of:

receiving at least one request for a ride, said request specifying a pick-up location and a destination location; and developing and updating a path for said ride, said path specifying the roads over which a rider will travel as well as the particular ones of said vehicles that said rider will ride in and the locations of any transfers that said rider must take;

wherein said path is developed as a function of current factors including (i) said pick-up location, (ii) said destination location, (iii) a present position of said vehicles, (iv) paths presently scheduled, and (v) traffic conditions along routes presently projected to be traversed by said vehicles, and on changes in the current factors.

26. The invention as defined in claim 25 wherein said request includes a desired time to arrive at said destination location and said path is also as a function of said desired arrival time.

27. The invention as defined in claim 25 wherein said request includes a desired departure time from said pick-up location said path is also as a function of said desired departure time.

28. The invention as defined in claim 25 wherein said path further specifies an amount of time that said ride will have to wait at each transfer location.

29. The invention as defined in claim 25 further including the steps of:

communicating to at least one of said vehicles that a delay in the arrival time of at least one of said rides is presently likely;

receiving a response from said at least one vehicle that said at least one ride agrees to pay a premium rate to have a new path developed so that said likely delay is avoided; and modifying said route of said at least one vehicle to incorporate changes necessary to accommodate said ride according to said developed path.

30. The invention as defined in claim 25 wherein said vehicle is a multipassenger vehicle.

31. The invention as defined in claim 25, further comprising providing a ride to said rider.

32. The invention as defined in claim 25, further comprising communicating said path to said particular ones of said vehicles.

33. A system for coordinating substantially on-demand transportation, comprising:

means for receiving a request for a ride, said request specifying a pick-up location and a destination location;

means for storing a route for each of a plurality of vehicles;

means for monitoring at least a present position of each of said vehicles and the traffic conditions existing along their respective routes;

means for developing and updating a path for said ride as a function of (i) said pick-up location, (ii) said destination location, (iii) said present position of said vehicles, (iv) said route for each of said vehicles, and (v) said traffic conditions, said path for said ride specifying an ordered arrangement of at least one of said vehicles and the locations of any required transfers; and means in at least one of said vehicles for communicating a change of said destination location while en route, wherein:

said means for developing is responsive to said communication for developing an updated present path; and said updated present path is communicated to said at least one of said vehicles.

34. The invention as defined in claim 33, further including means for charging said person a premium for developing said updated present path.

35. A system for coordinating substantially on-demand transportation, comprising:

means for receiving a request for a ride, said request specifying a pick-up location and a destination location;

means for storing a route for each of a plurality of vehicles;

means for monitoring at least a present position of each of said vehicles and the traffic conditions existing along their respective routes;

means for developing and updating a path for said ride as a function of (i) said pick-up location, (ii) said destination location, (iii) said present position of said vehicles, (iv) said route for each of said vehicles, and (v) said traffic conditions, said path for said ride specifying an ordered arrangement of at least one of said vehicles and the locations of any required transfers; and means for modifying said route of at least one of said vehicles to incorporate changes necessary to accommodate said ride according to said developed path.

36. The invention as defined in claim 35, further including means for relaying modified routes to said vehicles.

37. A system for coordinating substantially on-demand transportation, comprising:

- means for receiving a request for a ride, said request specifying a pick-up location and a destination location;
- means for storing a route for each of a plurality of vehicles;
- means for monitoring at least a present position of each of said vehicles and the traffic conditions existing along their respective routes;
- means for developing and updating the path for said ride as a function of (i) said pick-up location, (ii) said destination location, (iii) said present position of said vehicles, (iv) said route for each of said vehicles, and (v) said traffic conditions, said path for said ride specifying an ordered arrangement of at least one of said vehicles and the locations of any required transfers;
- means for communicating to at least one of said vehicles that a delay in the arrival time of at least one of said rides is presently likely;
- means for receiving a response from said at least one vehicle that said at least one ride agrees to pay a premium rate to have a new path developed so that said likely delay is avoided; and
- means for modifying said route of said at least one vehicle to incorporate changes necessary to accommodate said ride according to said developed path.

38. The invention as defined in claim 37, further including means for billing said at least one ride said premium rate.

39. A method for dispatching vehicles and coordinating on-demand, door-to-door rides, the method comprising the steps of:

- receiving a request for a ride, said request specifying a pick-up location and a destination location;
- developing and updating a path for said ride, said path specifying the roads over which a rider will travel as well as the particular ones of said vehicles that said rider will ride in and the locations of any transfers that said rider must take;
- communicating to at least one of said vehicles that a delay in the arrival time of at least one of said riders is presently likely;
- receiving a response from said at least one vehicle that said at least one rider agrees to pay a premium rate to have a new path developed so that said likely delay is avoided; and
- modifying said route of said at least one vehicle to incorporate changes necessary to accommodate said rider according to said developed path;
- wherein said path is developed as a function of (i) said pick-up location, (ii) said destination location, (iii) a present position of said vehicles, (iv) paths presently scheduled, and (v) traffic conditions along routes presently projected to be traversed by said vehicles.

* * * * *